United States Patent
Goodwin, III et al.

(10) Patent No.: US 6,724,318 B2
(45) Date of Patent: Apr. 20, 2004

(54) DEVICE AND METHOD OF LOCATING ELECTRONIC PRICE LABELS IN TRANSACTION ESTABLISHMENTS

(75) Inventors: John C. Goodwin, III, Suwanee, GA (US); Terry L. Zimmerman, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/200,709

(22) Filed: Jul. 22, 2002

(65) Prior Publication Data

US 2002/0196157 A1 Dec. 26, 2002

Related U.S. Application Data

(63) Continuation of application No. 08/593,983, filed on Jan. 30, 1996, now abandoned.

(51) Int. Cl.[7] .................................................. H04B 1/00
(52) U.S. Cl. ................... 340/825.49; 340/5.91
(58) Field of Search ........................ 340/825.49, 573.4, 340/10.1, 5.91; 455/440; 342/432; 705/1, 26; 235/383, 385; 345/2.3

(56) References Cited

U.S. PATENT DOCUMENTS

| | | | | |
|---|---|---|---|---|
| 4,656,463 A | * | 4/1987 | Anders et al. | 340/573.4 |
| 4,704,734 A | * | 11/1987 | Menich et al. | 455/440 |
| 4,881,082 A | * | 11/1989 | Graziano | 342/432 |
| 5,241,467 A | * | 8/1993 | Failing et al. | 705/1 |

* cited by examiner

*Primary Examiner*—Edwin C. Holloway, III
(74) *Attorney, Agent, or Firm*—Priest & Goldstein, PLLC; Paul W. Martin

(57) ABSTRACT

An electronic price label locator which uses signal strength and noise level information associated with signals from the electronic price label. The locator includes an input device which records identification information distinguishing the electronic price label from other electronic price labels. A receiver receives signals from the electronic price label. Signal strength and noise level determining circuitry measures signal strengths and noise levels associated with the signals. Processing circuitry determines a direction to the electronic price label. Finally, a display displays the direction. The locator may also be portable and include a handheld housing.

2 Claims, 8 Drawing Sheets

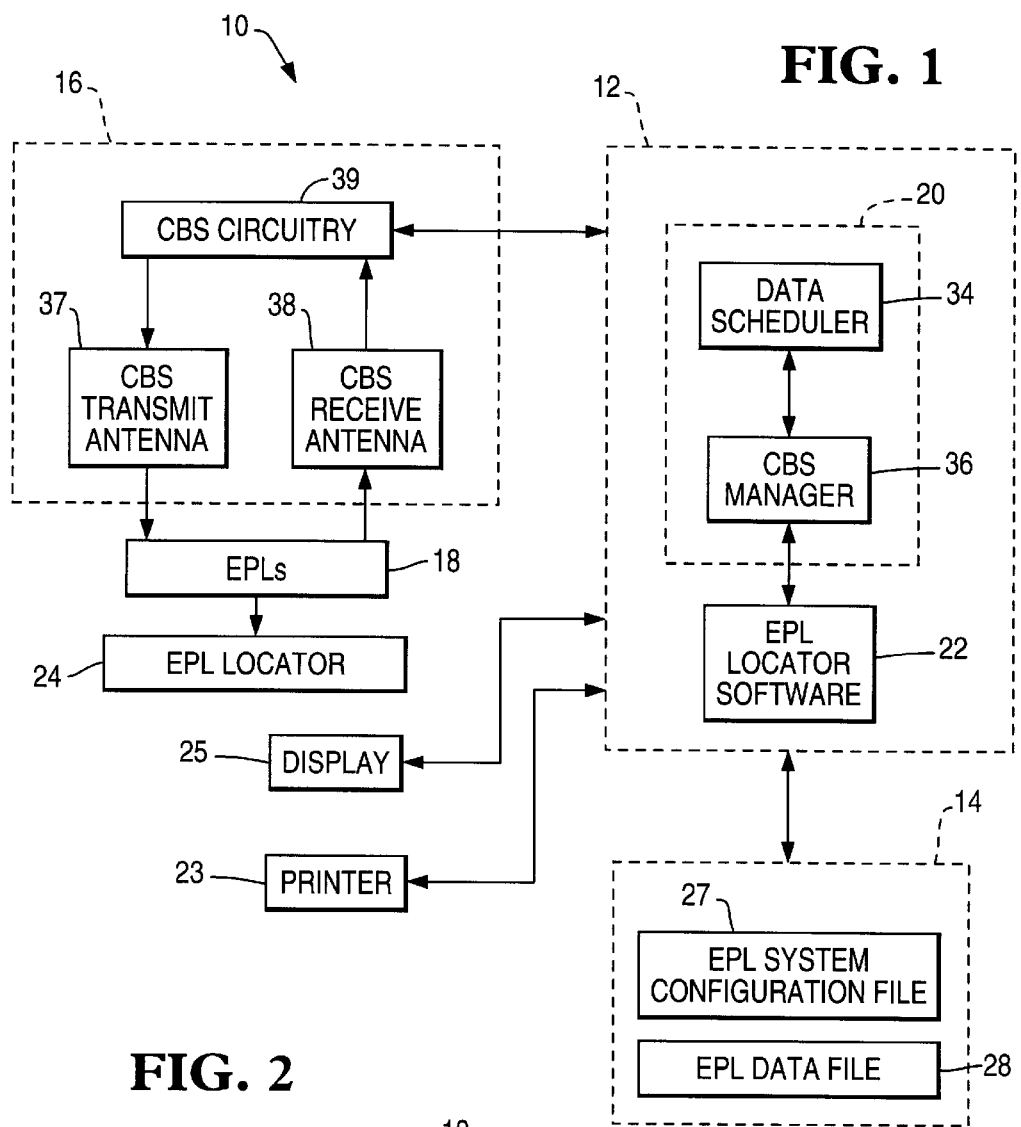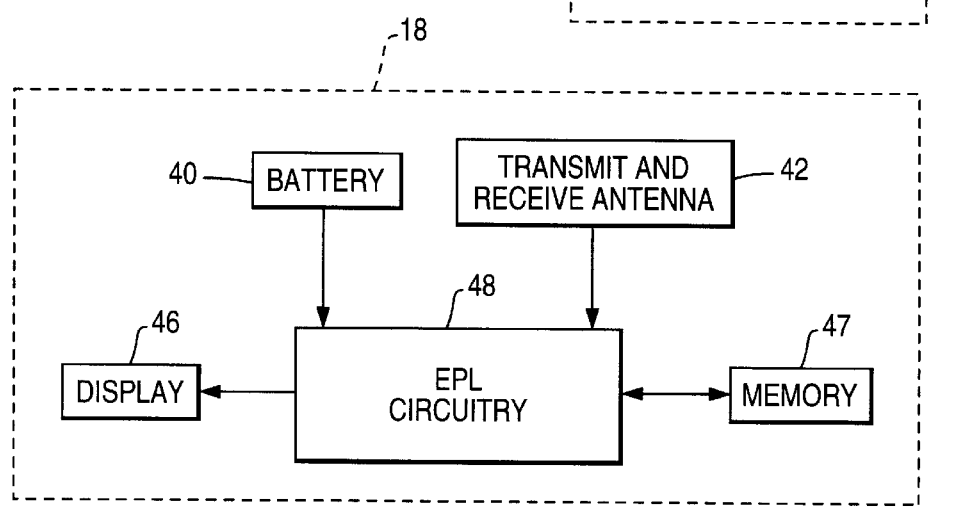

FIG. 10

```
EPL LOCATION REPORT
-----------------------------------

PRIMARY LOCALES:    4C
                    WINE SECTION FRONT LEFT

SECONDARY LOCALES:  3B, 3C, 3D, 4B, 4D, 5B, 5C, OR 5D
                    BAKERY MID-FRONT
                    WINE SECTION FRONT RIGHT
                    WINE SECTION MID LEFT
                    WINE SECTION END CAP
                    BAKERY MIDDLE
                    BAKERY FRONT
                    WINE SECTION MID RIGHT
                    WINE SECTION END CAP RIGHT
```

DEVICE AND METHOD OF LOCATING ELECTRONIC PRICE LABELS IN TRANSACTION ESTABLISHMENTS

CROSS-REFERENCE TO RELATED APPLICATIONS

The present application is a continuation of U.S. application Ser. No. 08/593,983 filed Jan. 30, 1996, now abandoned.

The present invention is related to commonly assigned and co-pending U.S. application entitled, "Method Of Locating Electronic Price Labels In Transaction Establishments", filed Oct. 5, 1995, invented by Goodwin, and having a Ser. No. 08/539,450, now abandoned.

BACKGROUND OF THE INVENTION

The present invention relates to electronic price label (EPL) systems used in transaction establishments, and more specifically to a device and method for locating EPLs in a transaction establishment.

EPL systems typically include a plurality of EPLs for each merchandise item in a store. EPLs typically display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. Price information displayed by the EPLs is obtained from the PLU file.

EPLs today may be wired or wireless. Wireless EPLs may employ infrared or radio frequency transmitters to transmit acknowledgment signals acknowledging receipt of messages and to relay acknowledgment signals from other EPLs to receiving devices coupled to a main EPL computer. An EPL only sends an acknowledgment if the message is addressed to it.

Over time, EPLs may be displaced from their mounting brackets. A customer or store employee may intentionally or unintentionally remove an EPL. In any case, the store must locate and reinstall the displaced EPLS, or determine that they are not in the store and replace them.

Therefore, it would be desirable to provide a device and method for locating EPLs in a transaction establishment.

SUMMARY OF THE INVENTION

In accordance with the teachings of the present invention, a device and method for locating EPLs in a transaction establishment is provided.

The locator includes an input device which records identification information distinguishing the electronic price label from other electronic price labels. A receiver receives signals from the electronic price label. Signal, strength and noise level determining circuitry measures signal strengths and noise levels associated with the signals. Processing circuitry determines a direction to the electronic price label. Finally, a display displays the direction. The locator may also be portable and include a hand-held housing.

It is accordingly an object of the present invention to provide a device and method for locating EPLs in a transaction establishment.

It is another object of the present invention to provide a device and method for locating EPLs in a transaction establishment which determine directions to an EPL from signal strengths and noise levels associated with signals from the EPL.

It is another object of the present invention to provide a device for locating EPLs in a transaction establishment which is portable and hand-held.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 1 is a block diagram of an EPL system;

FIG. 2 is a block diagram of an EPL;

FIG. 10 is a sample report generated by the EPL locator software.

DETAILED DESCRIPTION OF THE PREFERRED EMBODIMENT

Figure 3:
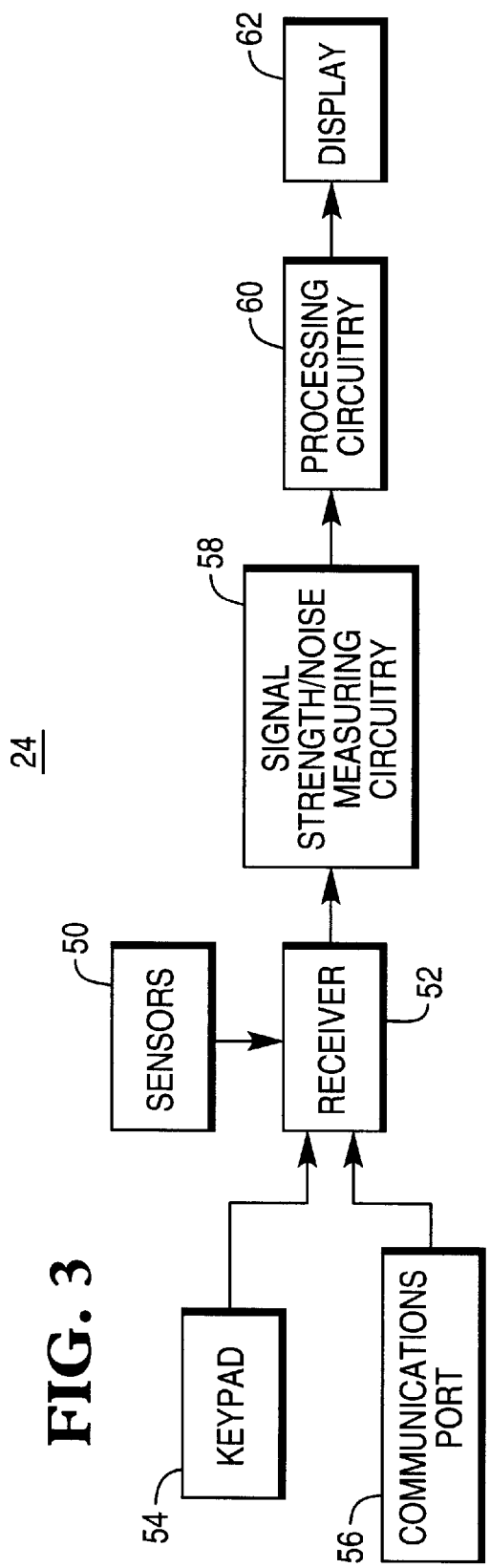
FIG. 3 is a block diagram of an EPL locator.

Referring now to FIG. 1, EPL system 10 includes computer 12, storage medium 14, communication base station (CBS) 16, electronic price labels (EPLS) 18, and portable EPL locator 24.

Computer 12 executes EPL control software 20 and EPL locator software 22. EPL control software 20 records, schedules, and transmits all messages to EPLs through CBS 16, and receives and analyzes status messages from EPLs 18 through CBS 16. EPL control software 20 also maintains and uses EPL data file 28, which contains item information, EPL identification information, item price verifier information, and status information for each of EPLs 18.

EPL control software 20 primarily includes data scheduler 34 and CBS manager 36. Data scheduler 34 schedules EPL price change messages to be sent to EPLs 18 through CBS 16.

EPL locator software 22 automatically monitors EPL system 10 for received signal strength and determines the location of identified EPLs, which it stores in EPL system configuration file 27. EPL system configuration file 27 tells computer 12 how system 10 is configured, i.e., the addresses of EPL system components and their location within a transaction establishment relative to other components within system 10, and the location of different types of goods in system 10. EPL locator software 22 displays or prints location results on display 25 and printer 23.

Storage medium 14 is preferably a fixed disk drive. Storage medium 14 stores EPL system configuration file 27 and EPL data file 28.

CBS 16 preferably includes one transmit antenna 37 and up to four receive antennas 38 for transmitting and receiving messages between CBS 16 and EPLs 18. CBS 16 includes CBS circuitry 39 which controls operation of CBS 16. EPL system 10 preferably includes a plurality of CBSs 16 connected together in series.

CBS manager 36 schedules transmission of price change messages to EPLs 18 and the reception of status messages from EPLs 18 for predetermined time slots.

Turning now to FIG. 2, EPLs 18 are illustrated.

EPLs 18 each include battery 40, transmit and receive antenna 42, display 46, memory 47, and EPL circuitry 48.

Battery 40 provides power to EPLs 18.

Transmit and receive antenna 42 receives price change and status messages from CBS 16.

Transmit and receive antenna 42 transmits responses to price change and status messages to CBS 16.

Display 46 displays price and possibly additional information. Display 46 is preferably a liquid crystal display (LCD).

Memory 47 stores price verifier information, EPL type information, and may additionally store promotional information. Preferably, the price verifier information is a checksum of the displayed price.

EPL circuitry 48 controls the internal operation of EPLs 18.

Turning now to FIG. 3, portable EPL locator 24 includes sensors 50, receiver 52, keypad 54, communications port 56, signal strength and noise measuring circuitry 58, processing circuitry 60, and display 62.

Sensors 50 may include antennas for RF systems and photodetectors for IR systems.

Receiver 52 receives signals from EPLs 18 through sensors 50.

Keypad 54 records entry of EPL identification numbers by an operator.

Alternatively, EPL identification information and optional approximate EPL fix information determined by EPL locator software 22 may be obtained by coupling communications port 56 to computer 12.

Signal strength and noise measuring circuitry 58 determines the signal-to-noise ratios for signals received through each of sensors 50.

Processing circuitry 60 determines a direction to EPL 18 from the signal-to-noise ratios.

Display 62 displays direction information, EPL identification information, and approximate fix information.

Figure 4:
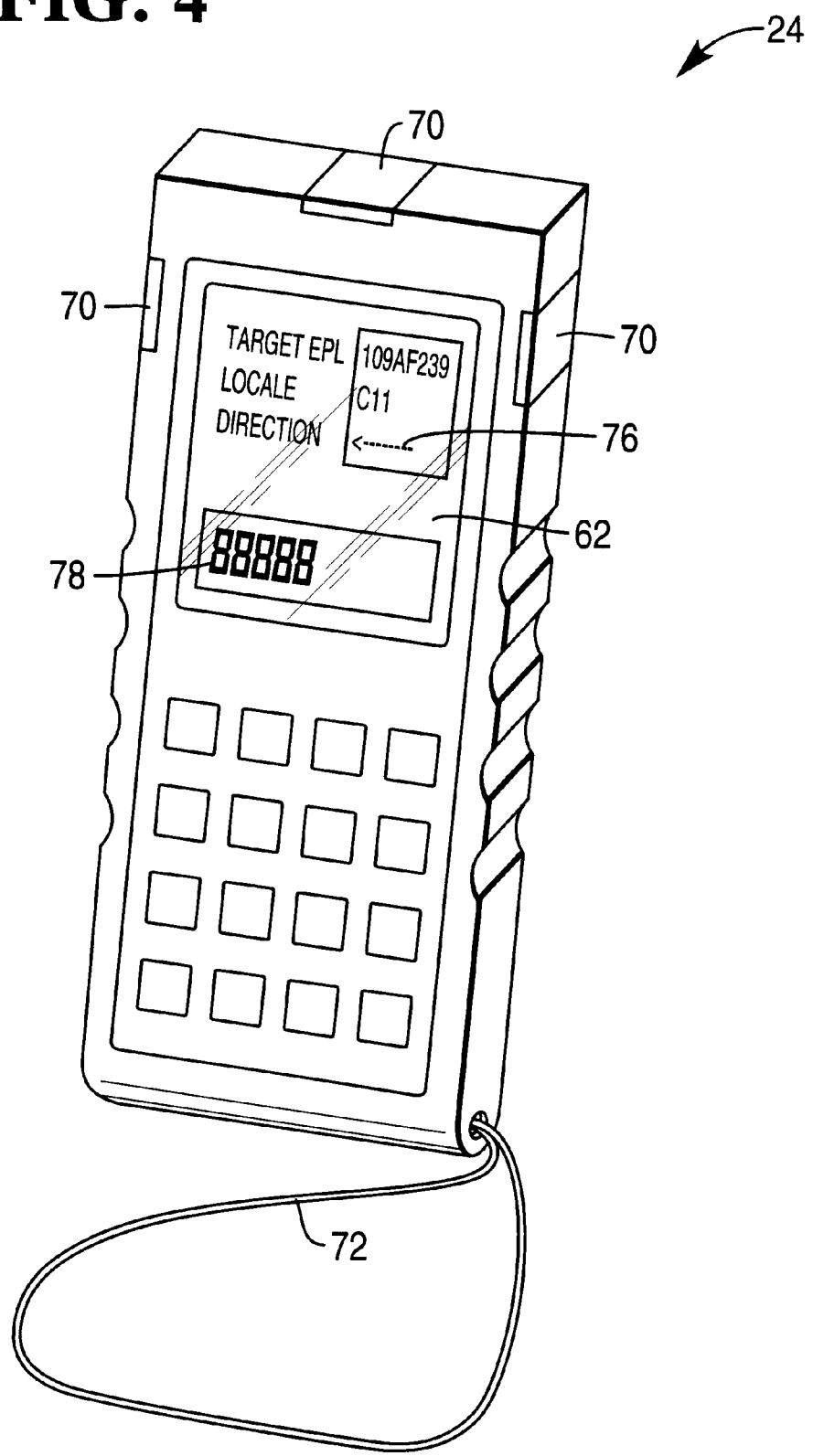
FIG. 4 is a view of a first embodiment of the EPL locator.

Turning now to FIG. 4, a first embodiment of EPL locator 24 is illustrated in more detail.

EPL locator 24 is preferably portable. Here, EPL locator 24 is generally rectangular in shape and includes antennae 70 for receiving RF acknowledgment signals sent by EPLs 18 to CBS 16. To obtain optimal fix information, antennae 70 are preferably located on three different sides of EPL locator 24. Since antennae 70 are small, they can be located inside of EPL locator 24. EPL locator 24 may also include a carrying strap 72.

Display 62 displays information about a particular EPL, which may include a serial or other identification number entered into EPL locator 24 by a user, an approximate location of the EPL entered into EPL locator 24 by the user, the signal strength and noise 78 of the signal from the EPL, and a direction arrow 76 pointing to the EPL. The approximate location of the EPL is preferably determined by the EPL locator software 22 in accordance with the method of FIG. 7.

Figure 5:
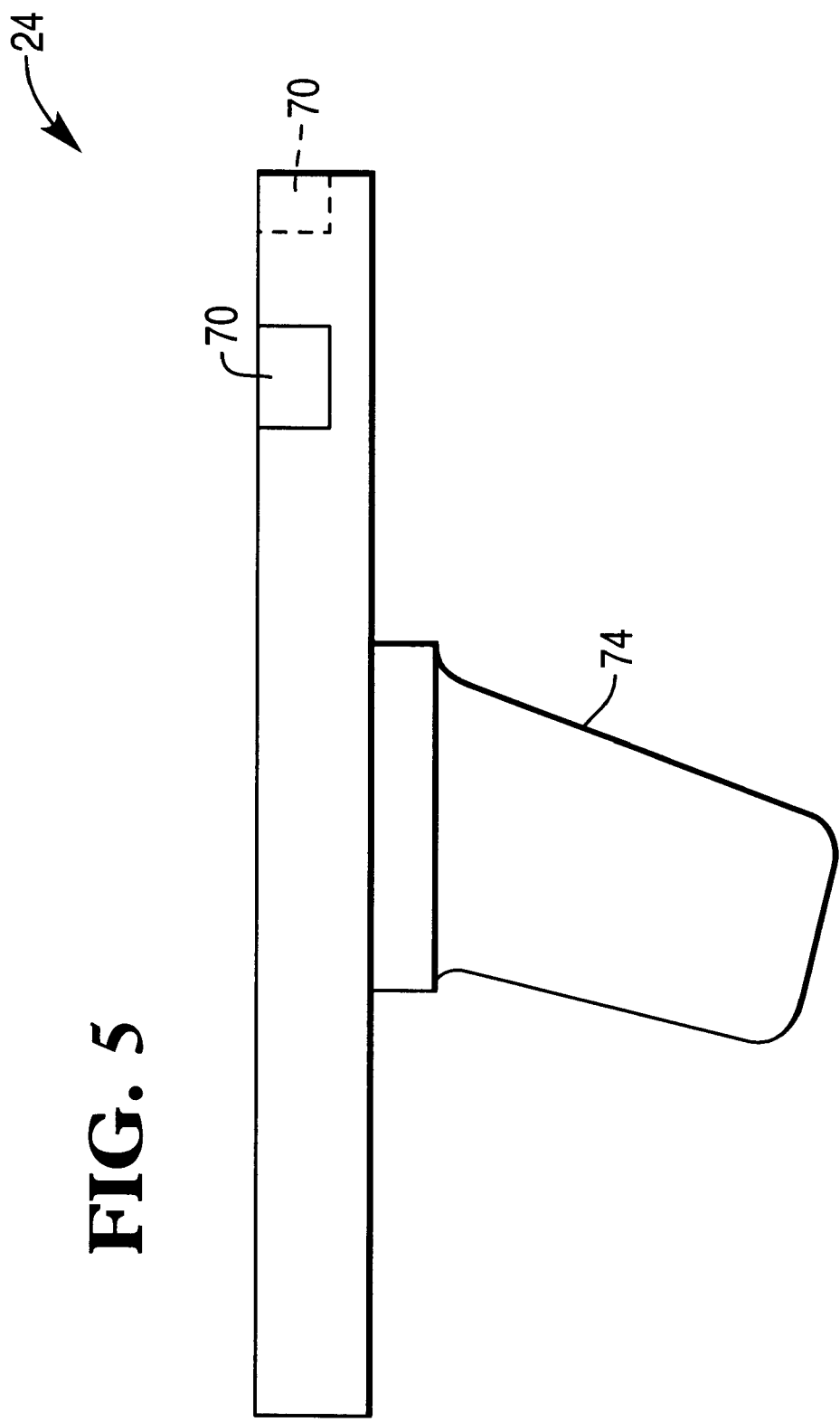
FIG. 5 is a view of a second embodiment of the EPL locator.

Turning now to FIG. 5, a second embodiment of EPL locator 24 is illustrated in more detail.

This embodiment is also preferably portable. Here, EPL locator 24 includes a gun-like handle 74, but is otherwise similar to the first embodiment.

Figure 6:
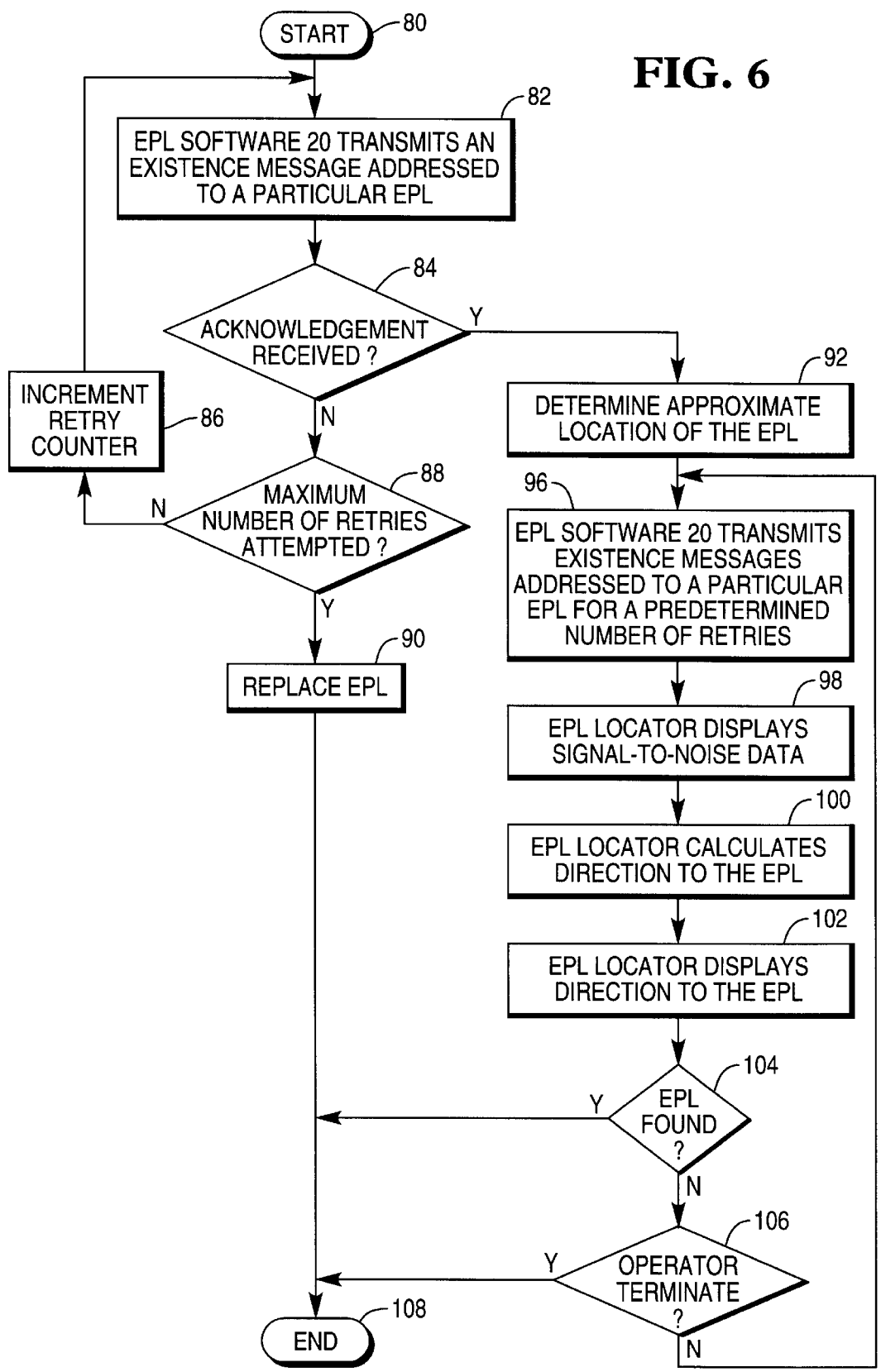
FIG. 6 is a flow diagram illustrating the operation of EPL control software in conjunction with the EPL locator.

Turning now to FIG. 6, the operation of portable EPL locator 24 in conjunction with EPL control software 20 is explained in more detail, beginning with START 80.

In steps 82–90, EPL control software 20 determines whether a particular EPL 18 is out of the store or not functioning.

In step 82, EPL control software 20 transmits an existence message addressed to EPL 18.

In step 84, EPL control software 20 waits for an acknowledgment message from EPL 18.

If an acknowledgment message is not received, EPL control software 20 determines whether the maximum number of existence message transmission retries has been attempted in step 88.

If the maximum number of existence message retries has not been reached, EPL control software 20 increments a retry counter in step 86 and returns to step 82.

If the maximum number of existence message retries has been reached, EPL control software 20 stops transmitting existence messages and provides an indication to an operator to replace EPL 18 in step 90, since EPL 18 is either not operating or outside the range (i.e., outside of the transaction establishment) of CBS 16. The method ends in step 108.

Returning to step 84, if an acknowledgment is received from EPL 18, the method proceeds to step 92. In step 92, EPL locator software 22 obtains an approximate location of EPL 18 in accordance with the steps illustrated in FIG. 7.

Steps 96–106 reflect the operation of EPL locator 24 in conjunction with EPL control software 20. The present invention envisions that such steps may be performed independently of steps 80–92 and where a rough estimate of the location of EPL 18 is not desired from EPL locator software 22 by an operator.

In step 96, EPL software 20 transmits existence messages addressed to EPL 18 for a predetermined number of retries.

In step 98, EPL locator 24 displays signal-to-noise data for the acknowledgment signals transmitted by EPL 18.

In step 100, EPL locator 24 calculates a direction to EPL 18 using basic radar tracking methods to determine the location of EPL 18.

In step 102, EPL locator 24 displays a direction to EPL 18.

In step 104, if an operator has found the displaced EPL 18, the method ends in step 108. The operator may then reinstall and reactivate the displaced EPL 18.

If the operator has not yet found EPL 18, the method continues to step 106, in which the operator may choose to discontinue the search. If the operator chooses to discontinue the search, the method ends in step 108. If the operator chooses to continue the search, the method returns to step 96 to allow the operator to home in on the displaced EPL 18.

Figure 7:
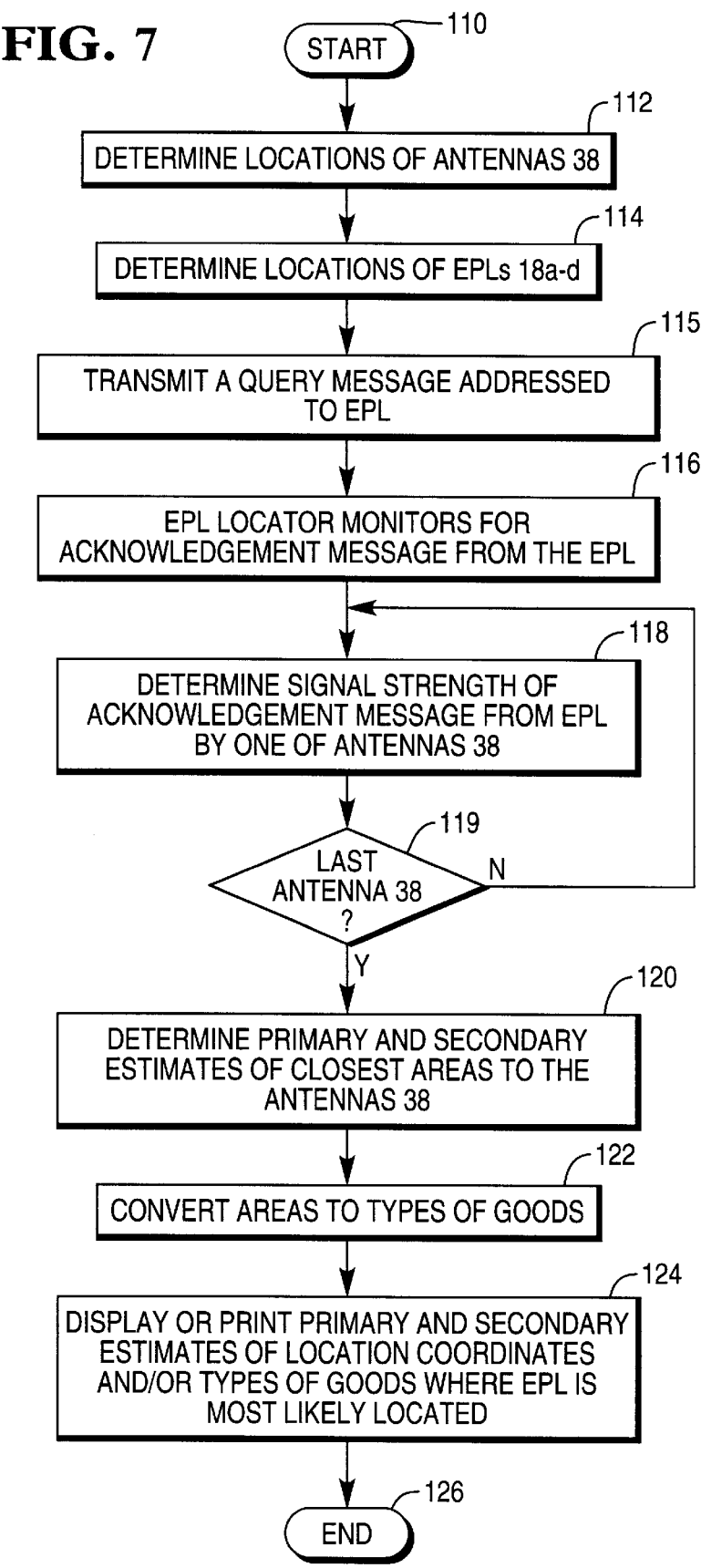
FIG. 7 is a flow diagram illustrating the method of locating the wireless EPLs by EPL locator software.

Turning now to FIG. 7, the operation of EPL locator software 22 represented by step 92 of FIG. 6 is explained in more detail, beginning with START 110.

In step 112, the locations of antennas 38 are determined. As an optional step, the locations of CBSs 16 may be plotted on the map of FIG. 8, but are included in configuration file 27 at installation time.

In step 114, the locations of EPLs 18 are determined. As an optional step, the locations of EPLs 18 may be plotted on the map of FIG. 8. This information is available in EPL configuration file 27, but is not reliable in a running system since changes occur often.

In step 115, EPL control software causes CBSs 16 to transmit a query message to a particular EPL, such as EPL 18.

In step 116, EPL locator software 22 listens for an acknowledgment message from the EPL.

In step 118, EPL locator software 22 determines the signal strengths of any acknowledgment message from the EPL 18 to one of antennas 38 within CBSs 16. If multiple antennas 38 receive the acknowledgment message, EPL locator software 22 uses basic radar tracking methods to determine the location of the EPL.

In step 119, EPL locator software 22 determines whether signal strength information for the last of antennas 38 has been determined. If all CBSs 16 have been polled for signal strength information about their antennas 38, the method continues to step 120. If a CBS has not been polled, the method returns to step 118.

Figure 8:
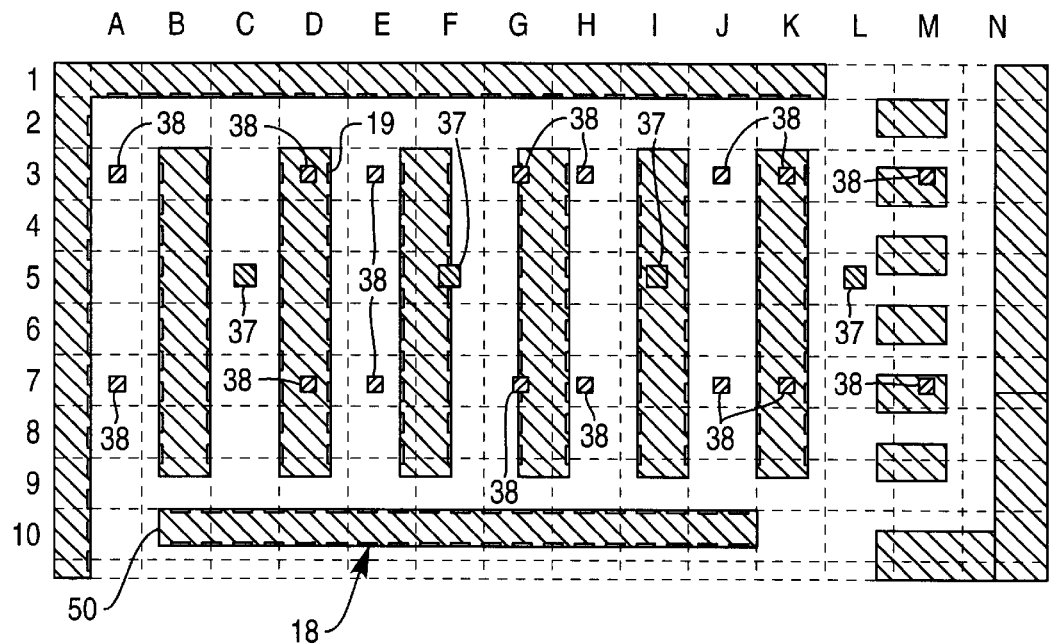
FIG. 8 is a first example of a map of a transaction establishment.

In step 120, EPL locator software 22 determines the primary and secondary estimates of fixes to the antennas 38 on the map in FIG. 8.

In step 122, EPL locator software 22 optionally converts the fixes to types of goods using information in EPL configuration file 27.

In step 124, EPL locator software 22 displays or prints primary and secondary estimates of the location coordinates and/or types of goods where the desired EPL is most likely located. A sample report is shown in FIG. 10.

If store personnel determine that the location of the EPL does not correspond to its location in EPL configuration file 27 (e.g., because a child has removed it and placed it somewhere else), they can place the EPL in its proper location.

In step 126, the method ends.

Turning now to FIG. 8, a map of a transaction establishment illustrates the location of shelves 50 and EPLs 18.

The locations of EPLs 18 are referenced to a two-dimensional coordinate system in which rows are identified by numerals and columns are identified by letters.

In this example, EPL 19 is sought after and is located at position 3D. Receive antennas 38 are located at 3A, 7A, 3D, 7D, 3E, 7E, 3G, 7G, 3H, 7H, 3J, 7J, 3K, 7K, 3M, and 7M. Transmit antennas 37 are located at 5C, 5F, 5I, and 5L.

If from the information in EPL configuration file 27 it is known that position 3D is 'in back of the pop aisle', then it is also known that EPL 19 is 'in back of the pop aisle'.

In this example, only one receive antenna 38 at position 3D hears the acknowledgment of EPL 19. The primary fix for EPL 19 is position 3D. A less accurate fix for EPL 19 is any one of positions 2C, 2D, 2E, 3C, 3E, 4C, 4D, or 4E that surround the primary fix.

Figure 9:
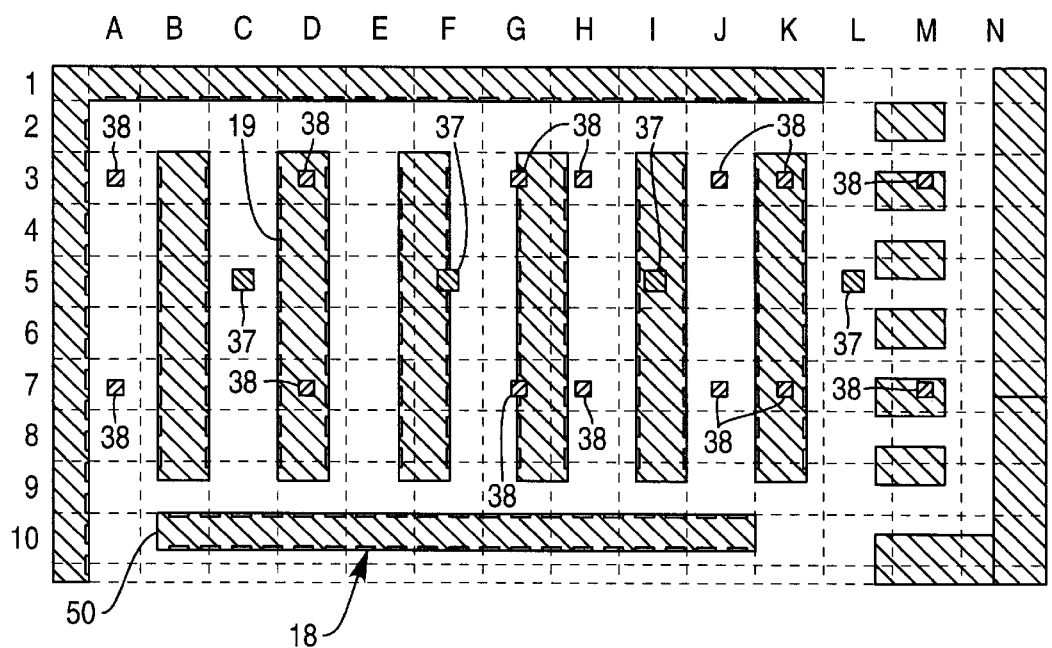
FIG. 9 is a second example of a map of a transaction establishment.

Turning now to FIG. 9, three receive antennae 38 at positions 3D, 3A, and 7D hear the acknowledgment of EPL 19. Antenna 3D reports a relative signal strength of "60", and antennae 3A and 7D report relative signal strengths of "30". The primary fix for EPL 19 is position 4C. A secondary fix for EPL 18 is any one of positions 3B, 3C, 3D, 4B, 4D, 5B, 5C, or 5D that surround the primary fix. Here, EPL 19 is actually located in one of the secondary fixes, 4D.

Although the present invention has been described with particular reference to certain preferred embodiments thereof, variations and modifications of the present invention can be effected within the spirit and scope of the following claims.

What is claimed:

1. An apparatus for locating an electronic price label detached from its intended location and displaying a price of associated merchandise items comprising:

a hand-held housing;

a keypad within the hand-held housing for recording identification information which distinguishes the electronic price label from other electronic price labels;

a receiver within the hand-held housing and coupled to the keypad for receiving acknowledgement signals from the detached electronic price label having an intended location adjacent the associated merchandise items along a leading edge of a shelf on which the associated merchandise items are placed, wherein said acknowledgement signals are transmitted by the electronic price label in response to existence messages addressed to the electronic price label, wherein said existence messages and price change messages to update the price displayed are both wirelessly transmitted to the electronic price label utilizing a common communication base station;

signal strength and noise level determining circuitry within the hand-held housing and coupled to the receiver for measuring signal strengths and noise levels associated with the acknowledgement signals;

processing circuitry within the hand-held housing and coupled to the signal strength and noise level determining circuitry for determining a direction to the electronic price label from the signal strengths and noise levels; and a display within the hand-held housing and coupled to the processing circuitry for displaying the direction.

2. The apparatus as recited in claim 1, further comprising:

a communications port for alternatively receiving the identification information which distinguishes the electronic price label from the other electronic price labels from a computer.

* * * * *